United States Patent [19]

Burzacchi

[11] Patent Number: 5,681,110
[45] Date of Patent: Oct. 28, 1997

[54] SWIMMING POOL TEMPERATURE MONITOR

[76] Inventor: Alessandro Burzacchi, 2010 Parkside Cir. S., Boca Raton, Fla. 33486

[21] Appl. No.: 580,588

[22] Filed: Dec. 29, 1995

[51] Int. Cl.$^6$ .................................................. G01K 13/00
[52] U.S. Cl. .......................... 374/156; 374/142; 374/208
[58] Field of Search ................................. 374/141, 142, 374/156, 163, 170, 208

[56] References Cited

U.S. PATENT DOCUMENTS

| | | | |
|---|---|---|---|
| 2,091,693 | 8/1937 | Spencer | 374/156 |
| 4,435,095 | 3/1984 | Jones et al. | 374/208 |
| 4,739,549 | 4/1988 | Plimpton | 374/156 |
| 5,152,610 | 10/1992 | Hallett | 374/156 |
| 5,169,236 | 12/1992 | Iest | 374/142 |
| 5,302,028 | 4/1994 | Carey | 374/156 |
| 5,621,390 | 4/1997 | Neal | 374/156 |

FOREIGN PATENT DOCUMENTS 460100  5/1928  Germany ................. 374/156

*Primary Examiner*—G. Bradley Bennett
*Attorney, Agent, or Firm*—Robert M. Downey, P.A.

[57] ABSTRACT

A water monitoring device including a substantially transparent, buoyant housing which floats in the water. A water temperature transducer provides a voltage proportional to the water's temperature. A processor processes the voltage into a primary digital signal, and a driver drives a digital display according to the primary digital signal. The display is disposed within the housing and displays the temperature such that it can be read through the housing. The display is translucent so that it can be illuminated from its back side. The lower portion of the housing is structured to refract underwater light from outside the housing onto the back of the display. A rechargeable battery powers the device, and a solar panel recharges the battery. The upper portion of the housing is structured to refract light from outside the housing onto the solar panel. A control module controls the rate of recharging of the battery so that the battery's temperature remains within a preferred range.

15 Claims, 3 Drawing Sheets

SWIMMING POOL TEMPERATURE MONITOR

FIELD OF THE INVENTION

This invention relates generally to pool gauges, and more specifically to a pool water temperature meter that automatically and continually displays the water temperature of a swimming pool.

BACKGROUND OF THE INVENTION

Typically, devices for monitoring water temperature in swimming pools employ mercury thermometers or the like. This type of device has the advantage of being independent from any power supply, because it requires none to run. However, because this type of device is difficult to read from any distance, it generally has to be removed from the water in order to be read, not to mention the problems involved with determining the temperature at night.

The idea of utilizing liquid crystal display ("LCD") to create a larger, more visible display may partially address the visibility problem, but it raises other considerations, primarily regarding supplying power to the LCD and to the circuitry necessary to provide a digital representation of the water temperature. If the power is supplied by a standard battery, the battery will have to be replaced frequently to keep the device in working order. The additional power needed to illuminate the LCD, so that it can read at night, not only greatly increases the power drain but poses safety risks as well.

Solar rechargeable batteries can be used to avoid the battery-replacement problem, but this creates new problems with overheating, as well as the challenge of creating a device which maximizes exposure of the solar panel to the sun.

There is a need for a device that automatically and continually displays the water temperature of a swimming pool, and should be visible during both daylight and night in a typical pool. There is an additional need for such a device that can be left in the pool for extended periods of time without requiring user input or replacement batteries. In addition, there is a need for such a device to be safe and durable.

SUMMARY OF THE INVENTION

The present invention fulfills the need in the art. Broadly described, the present invention provides a pool water temperature meter that automatically and continually displays the water temperature of a swimming pool.

In a preferred embodiment of the present invention, the water monitoring device includes a substantially transparent, buoyant housing having an upper portion and a lower portion. The device floats in the water with the upper portion substantially above water. A conditions sensor is disposed primarily within the housing (extending partially from the housing). This sensor measures select physical conditions of the water. A display is disposed within the housing for displaying the conditions such that the conditions can be read through the housing. The lower portion of the housing is structured to refract light from outside the housing onto the display. A communicator is also disposed within the housing. This element communicates the conditions from the conditions sensor to the display. A rechargeable battery is disposed within the housing for powering the device. Finally, a solar panel is disposed within the housing for recharging the battery. The upper portion of the housing is structured to refract light from outside the housing onto the solar panel.

In the preferred embodiment, the display is digital. The display has a front side and a back side, with the conditions displayed on the front side. The display is translucent so that it can be illuminated from its back side. The lower portion of the housing includes a lower interior face and a lower exterior face. The lower interior face is disposed at an angle with respect to the lower exterior face such that light passing from outside the housing through the lower exterior face is refracted as a result of that angle toward the back side of the display.

The upper portion of the housing should include a facade and an end. The front side of the display is visible through the facade, while the solar panel is disposed near the end. The end includes facets which are disposed at angles to one another and facing the solar panel so that light passing from outside the housing through the facets will be refracted toward the solar panel.

Preferably, the conditions sensor has a water temperature transducer which provides a voltage proportional to the water's temperature. The communicator therefor includes a processor (which processes the voltage into a primary digital signal) and a driver (which drives the display according to the primary digital signal).

A control module is preferably provided for controlling the solar panel's rate of recharging the battery so that the battery's temperature remains within a predetermined range. This control module further includes a battery temperature sensor (for gauging the battery's temperature) and a shifting mechanism which decreases the rate of recharging whenever the battery's temperature exceeds a predetermined temperature and increases the rate of recharging whenever the battery's temperature is below that predetermined temperature.

The device could also include a clock for keeping real time, and the conditions sensor can further include an acidity sensor for monitoring a pH level of the pool and an ORP sensor for monitoring an oxidation reduction potential of the pool. The processor would process the real time, the pH level, and the oxidation reduction potential into additional digital signals. The driver additionally would drive the display according to these additional digital signals. A switching mechanism could be provided to alternate according to which among the digital signals the driver drives the display.

An alternate form of the present invention provides a substantially transparent, buoyant housing having an upper portion and a lower portion, the upper portion having a facade and an end. A conditions sensor is disposed primarily within the housing, extending partially from the housing, for measuring a select physical condition of the water. A processor processes the condition into a corresponding digital signal. A driver drives the display according to the digital signal.

Preferably, the conditions sensor includes a water temperature transducer for providing a voltage proportional to the water's temperature. The corresponding digital signal includes a primary discrete digital signal processed by the processor from the voltage.

If a clock is provided for keeping real time, and if the conditions sensor further includes an acidity sensor for monitoring a pH level of the pool and an ORP sensor for monitoring an oxidation reduction potential of the pool, then the corresponding digital signal further includes a set of additional discrete digital signals as a result of the processor's processing the real time, the pH level, and the oxidation reduction potential. A switching mechanism can be provided for alternating according to which among the discrete digital signals the driver drives the display.

In an alternate form of the present invention, a substantially transparent, buoyant housing has an upper portion and a lower portion, the upper portion having a facade and an end. A water temperature transducer provides a voltage proportional to the water's temperature. An acidity sensor monitors a pH level of the pool. An ORP sensor monitors an oxidation reduction potential of the pool. A clock keeps real time. A processor processes the voltage, the pH level, the oxidation reduction potential, and the time into corresponding digital signals. The digital display alternately displays the water's temperature, the pH level, the oxidation reduction potential, and the time. The switching mechanism alternates according to which among the digital signals the driver drives the display.

Accordingly, it is an object of the present invention to provide a device which is intended to be left in the pool for extended periods of time, and be powered over the long-term by means of a solar-charged internal battery pack.

It is a further object of the present invention to provide a device which is simply placed in the pool and operates automatically. User controls and adjustments are neither provided nor necessary for proper operation.

It is yet a further object of the present invention to provide a device which can visibly operate during both daylight and night in a typical pool.

It is a further object of the present invention to provide a device which has been designed to maximize safety and product life.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

For a fuller understanding of the nature of the present invention, reference should be had to the following detailed description taken in connection with the accompanying drawings in which:

FIG. 3A is a cut-away view of the preferred embodiment of the subject unit as viewed from its end.

DETAILED DESCRIPTION OF THE PREFERRED EMBODIMENT

Figure 1:
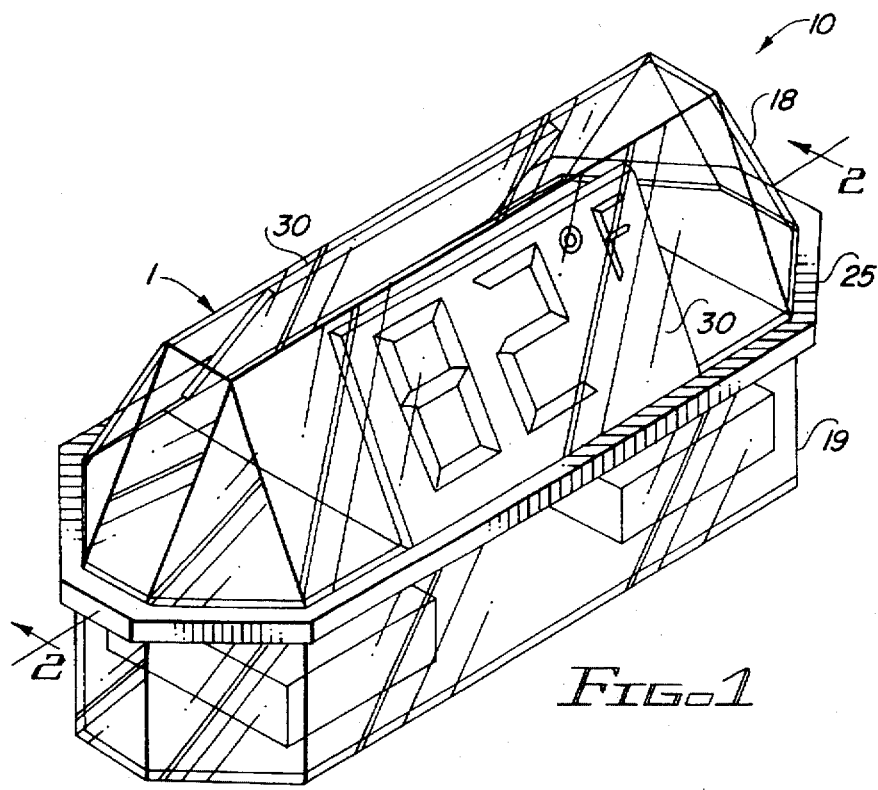
FIG. 1 is a perspective view of the preferred embodiment of the present invention.

Referring now to the drawings, in which like numerals indicate like elements throughout the several views, FIG. 1 illustrates a perspective view of the subject device 1, which is intended to float on the surface of a swimming pool. Enclosure 10 is preferably formed of plastic or a like material. It is designed to hold the operational components, as well as provide the buoyancy to keep the device afloat. Ring 25, preferably made of a soft elastomer, is disposed between the upper and lower portions 18, 19 of the housing 10, and provides a rub-rail surface to buffer contact with the sides of the pool. While not visible in this figure, a tie down point can be provided from which the device can be anchored, if desired. In the preferred embodiment, display 30 is a liquid crystal display (LCD), visibly showing the water temperature. A digital display 30 is preferably because it eliminates any parallax that may be encountered in analog devices. Only partially visible in this view, an additional display 30 is provided on the reverse side of the unit.

Figure 2:
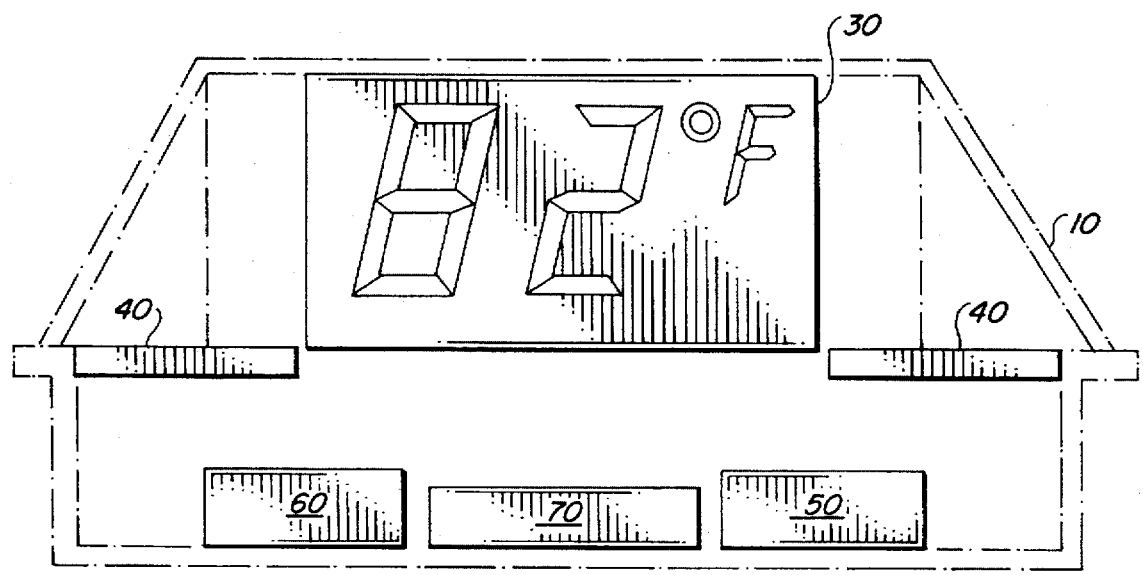
FIG. 2 is a cut-away front view of the preferred embodiment along line 2—2 in FIG. 1.

FIG. 2 depicts a cut-away front view of the preferred embodiment along line 2—2 in FIG. 1. This figures shows the placement of the internal components within the case 10. The component placement, while not essential to the operation of the device, has been chosen for optimal performance and to improve many features of the subject device. An LCD 30 is disposed on each side of the unit. Only one LCD 30 is visible in this figure; the other is directly behind it. The LCD's 30 utilized in the preferred embodiment of the subject unit are of the trans/flective type, which can be illuminated either by front or back lighting. The particular utility of these properties of the trans/flective type display 30 in improving the operation of the subject unit will be discussed later in this disclosure.

Solar cells 40, of which there are preferably two, are utilized to charge the internal batteries 70 of the subject unit. Solar cells 40 are disposed as shown at either end of the device for maximum exposure to available light. It is the combination of concerns about the visibility of the LCD 30 and the exposure of the solar cells 40 which drives the overall configuration of the housing 10 and the placement of the components within the device. Sensor electronics panel 50 contains a sensor element (or elements, as discussed later), sensor circuitry, and display-driver electronics. Power control module 60 contains circuitry for controlling the charge rate of the internal batteries 70, a feature the benefits of which will be made apparent later. The size of the sensor electronics panel 50 and the power control module 60 is exaggerated in this view. Current technology allows this circuitry to be contained in a very small volume.

FIG. 3A depicts a cut-away view of the preferred embodiment of the subject unit as viewed from its end. Display units 30 are disposed just below the facade 11 of the unit housing 10. The housing 10 itself is preferably a hard, clear plastic such as plexiglas. As discussed earlier, the LCD 30 are trans/flective. As sunlight or any bright exterior light shines on the unit, as depicted by arrows (a), the light reflects off the front of the display unit 30, making the displayed characters highly visible. This takes advantage of the reflective property of the display. The device is designed so that the display 30 will be visible in low light conditions as well.

As illustrated in this view, below the pool surface and beneath each display 30, sides 12 are horizontal on the exterior 14 but angles on the interior surface 15. This is so that this portion of the sides 12 can act in e manner of a lens to provide "passive" back lighting for the LCD's 30. At night, or whenever there is insufficient exterior light for reflective display, the light depicted by arrow (b)—from the underwater lights within the swimming pool enters the sides 12 of the housing 10. The lens formed by the interior plexiglas surface 15 will refract the light, focusing it on the rear of the displays panel 30. Since the display panel 30 is a transflective type, the swimming pool light can act as back lighting, utilizing the transparent/translucent properties of the display 30. While providing good contrast ratios, this configuration eliminates the need for power-hungry and potentially hazardous high voltages which are associated with traditional back-lighted LCD displays. In this illustration, reflective and refractive paths (a) and (b) are shown on only one side of the unit for illustrative purposes. Of course, during actual operation, light can strike the unit from either side.

Figure 3B:
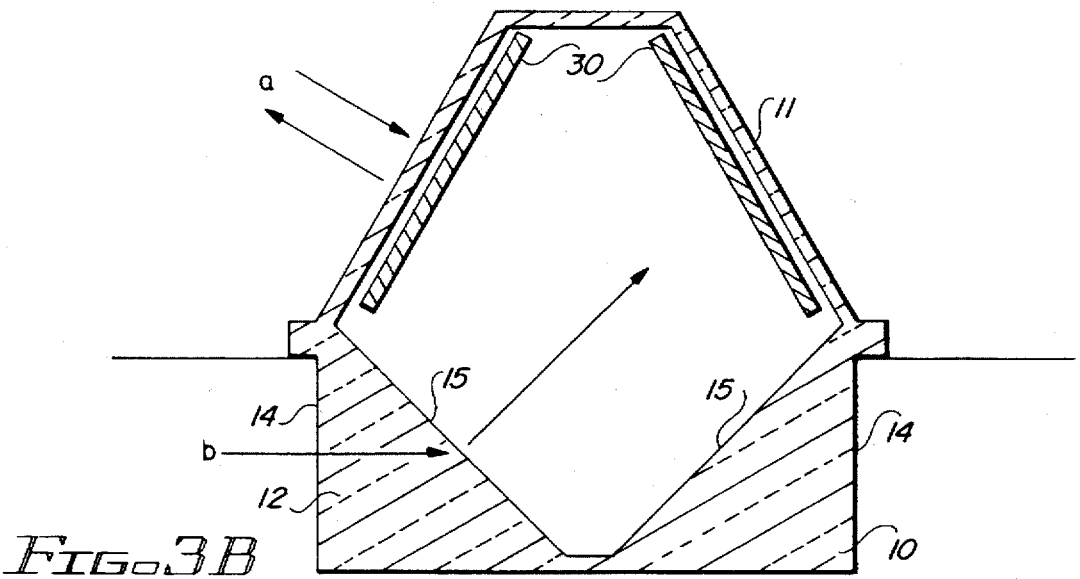
FIG. 3B is a cut-away view of an alternate embodiment of the subject unit as viewed from its end.

FIG. 3B illustrates an alternate embodiment of the back light lens. In this embodiment, below the pool surface and beneath each display 30, sides 12 are horizontal on their exterior 14 and interior 15 surfaces. Instead of solid plexiglas sides with angled interior surfaces, separate panels 17 are provided on the interior to act as lenses. Here, the light from the underwater lights as depicted by arrow (b), passes straight through the sides 12 of the housing 10, and the lens formed by the interior plexiglas panel 17 focuses the light on the rear of the displays panels 30. While this embodiment will result in poorer refraction patterns, it will pass slightly more visible light. In addition, the lower portion 19 will be lighter, and may have to be weighted to provide proper ballast. This configuration does permit more room for arranging the interior components.

Figure 4:
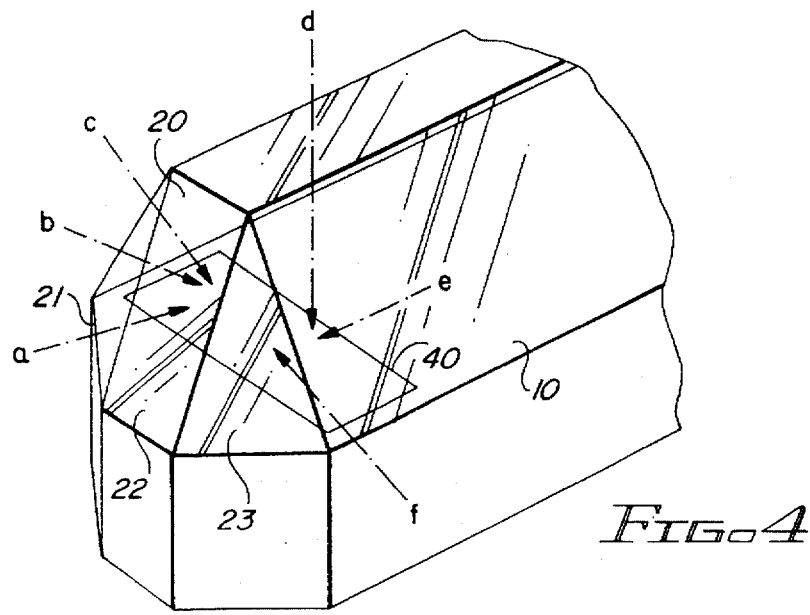
FIG. 4 is a detailed view illustrating a particular feature of the preferred embodiment.

FIG. 4 is a detailed view illustrating the placement of one of the two solar cells 40 within the subject unit's housing 10. Just as the interior surface 15 of the clear plexiglas is designed to focus underwater light on display 30, the shape of the housing 10 is provided to focus the available sunlight onto the surface of the solar cell 40. Rather than simply square off the housing 10, a multi-faceted, slanted and wall 20 is provided. By providing multiple facets 21, 22, 23, and by slanting the facets 21, 22, 23, rather than providing a single, vertical wall, the device is better able to utilize sunlight from various angles.

In the preferred embodiment, three facets 21, 22, 23 are employed in a symmetric fashion as shown in this figure. However, other configurations can be employed, including a rounded end wall, to provide a similar effect. In any configuration, it is preferred that the interior surfaces of the plexiglass "face" the solar cell 40—i.e., angled to be approximately perpendicular to an imaginary line drawn from the solar cell to the facet—to create the desired focusing effect.

Possible light paths are depicted in this figure as arrows (a) through (f). Because the solar cells 40 located at both ends of the subject device are configured similarly, the desired effect should occur at either end. This maximizes the charge capability for the internal battery system by allowing light to reach the solar cells 40 regardless of the orientation of the device in the swimming pool.

Figure 5:
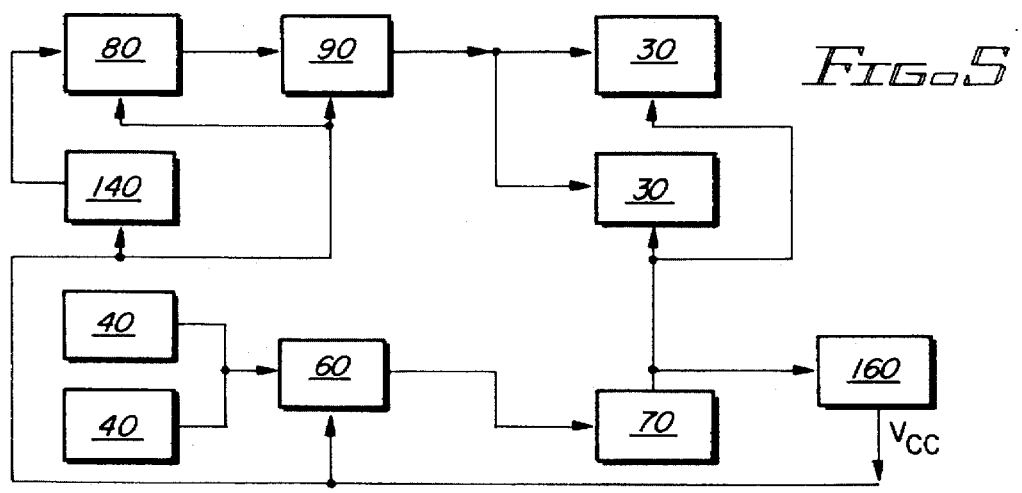
FIG. 5 is a block diagram of the preferred embodiment's electronics.

FIG. 5 is a block diagram of the unit's electronics. Temperature sensor 140 is preferably a thermistor or like device which provides a variable voltage in direct relation to the water temperature. Sensor board 80 processes this voltage, via any of a number of well-known analog to digital conversion techniques, into a digital signal that is applied to display driver 90. One of the simplest and best known A to D conversion method involves feeding the analog signal to a series of comparators or operational amplifiers (not shown explicitly) which each provide either high or low output voltages depending upon whether the analog signal exceeds their individual threshold voltages. An encoder (not shown explicitly) reads which of the comparators' outputs are high or low and translates the combination into a digital signal of a recognizable code (i.e., binary). The display driver 90 further interprets the digital signal and supplies the appropriate stimuli to the seven-segment type displays 30. Calibrating the comparators and the thermistor, and the subsequent wiring of the driver 90, encoder, and displays 30 are simple matters of integrated circuit design, well known in the art.

Battery 70 provides the power need to operate the system. The battery 70 output voltage is applied directly to the two display units 30, and is further applied to the voltage regulator circuit 160, which furnishes a regulated voltage to all circuits other than the display units 30. This voltage line is noted as $V_{cc}$ in the diagram. The display units 30 are chosen so that they can run on unregulated voltage, which they do in this case in order to reduce the load on the small regulator 160.

The battery 70 is charged via the solar cells 40. The charge rate is controlled by the charging circuit 60 which is composed of normal voltage and current limiting circuits familiar to those skilled in the art. In addition to these normal circuits, a unique circuit is implemented to maintain the battery 70 at a safe temperature, which will greatly extend battery life.

Figure 6:
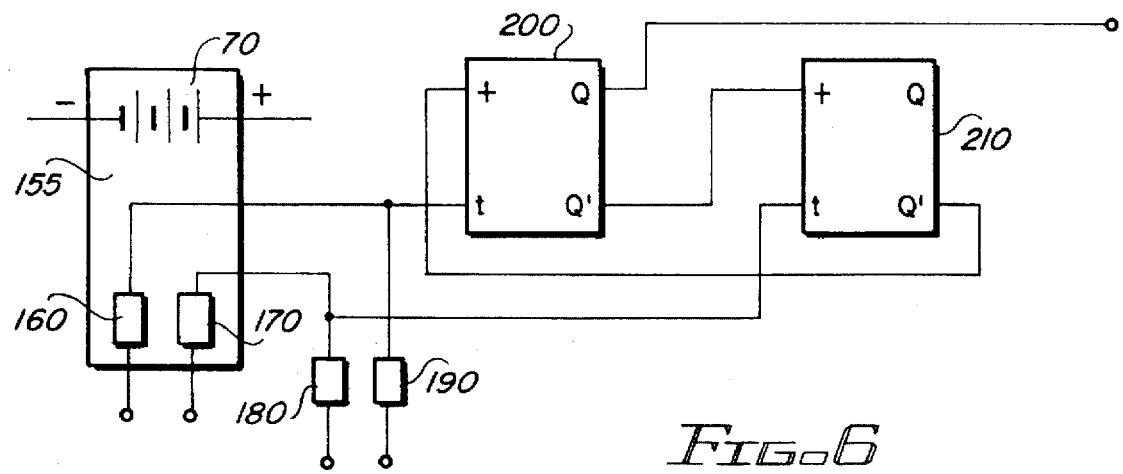
FIG. 6 is a schematic of the circuitry of a feature of the preferred embodiment.
Figure 7:
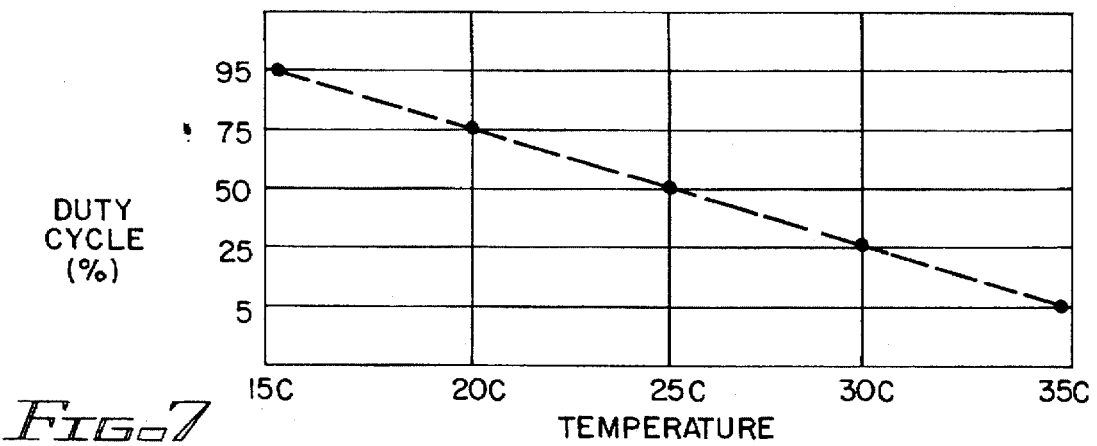
FIG. 7 is a plot of typical duty cycle rates for the recharging feature of the preferred embodiment.
Figure 3B:
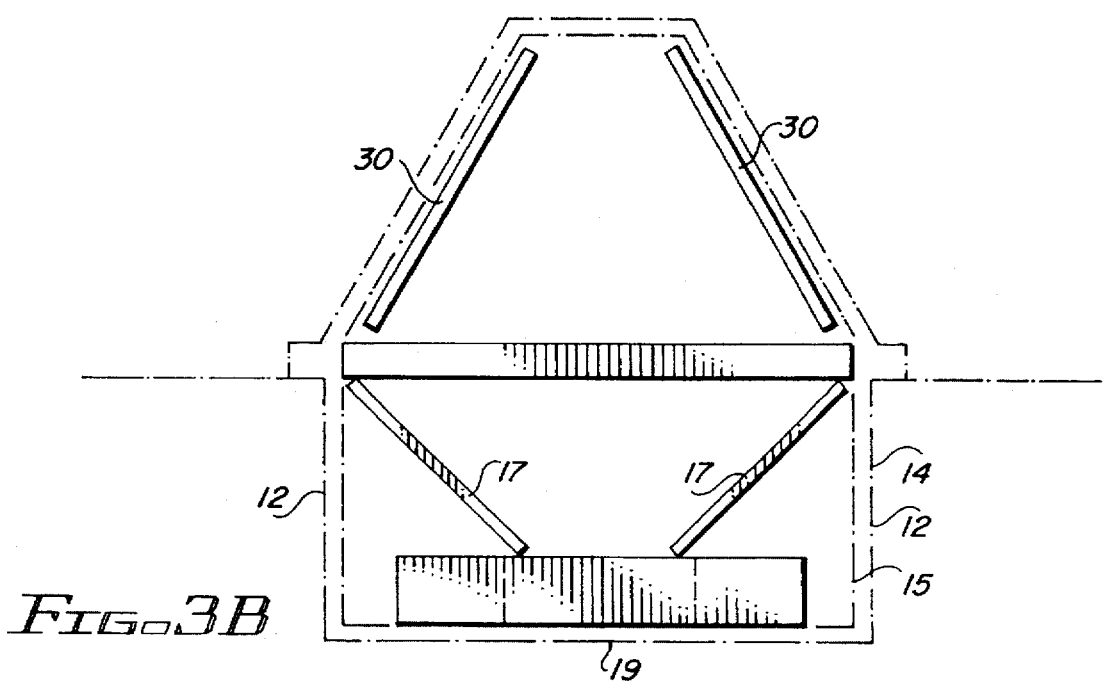

FIG. 6 shows the circuitry utilized to monitor the battery temperature and control the charge cycle time. The battery compartment 155 contains two thermistors 160, 170. Thermistor 160 is a variable resistor having a resistance which varies inversely with temperature. Thermistor 170 is also a variable resistor, but its resistance is directly proportional to temperature. Therefore, as the temperature in the battery compartment 155 rises, the resistance of thermistor 160 will increase, while that of thermistor 170 will decrease. Capacitors 180, 190 each have a constant capacitance. These capacitors 180, 190 combine with the thermistors 160, 170 to form a pair of RC circuits having variable time constants—one increasing and the other decreasing with temperature. The outputs of the two timing circuits are the timing inputs (t) of the monostable multivibrators 200, 210. The multivibrators 200, 210 are connected to form a free running clocking circuit. The thermistors 160, 170 and capacitors 180, 190 are selected so as to have approximately equal time constants—therefore achieving 50% symmetry—at a temperature within the safe operating range of the battery 150, generally about 25° C. The Q side output 220 of multivibrator 200 forms the active signal controlling the duty cycle of the charging system. As the temperature of the battery 150 increases, the duty cycle or pulse width of the output 220 decreases, slowing the charge rate, which in due time lowers the battery temperature. Conversely, as the battery temperature decreases, the charge rate will increase. Typical duty cycle rates for the recharging are illustrated in FIG. 7. Thus, the system optimizes the charge rate. The rate is kept as high as possible while still protecting the battery 150 from the excessive temperatures that can occur during charge cycles, in the process maintaining the entire device at a safe temperature. This is important because it greatly extends the expected life of the battery 150 as well as keeping the unit from becoming too hot to be lifted by hand from the underside.

While the device has been described as a temperature meter, it should be understood that the device can incorporate a pH sensor and/or an oxidation reduction potential (ORP) sensor, utilizing the existing digital displays 30 to provide rotating readout of those parameters. In addition, since there is suitable electronics on board, a real-time clock can be included if desired. The addition of these items is readily understood by those skilled in the art. The switching circuitry employed for rotating the display 30 among the various parameters is very similar to battery-charger timing switch but with constant (for practical purposes, not temperature-dependent) resistances, resulting in constant time periods.

Although multiple embodiments are described herein, it should be understood that the inventor intends for this invention to cover other pool gauges not described herein. For instance, the end wall 20 of the housing 10 could have a different number of facets, as long as they provided the desired focusing effect. Or alternate analog to digital conversion means could be employed, as many are known in the art.

What is claimed is:

1. A water monitoring device comprising:
   a substantially transparent, buoyant housing having an upper portion and a lower portion;
   a conditions sensor disposed primarily within said housing, extending partially from said housing, for measuring select physical conditions of said water;
   a display disposed within said housing for displaying said conditions such that said conditions can be read through said housing;
   wherein said lower portion of said housing is structured to refract light from outside said housing onto said display;
   a communicator disposed within said housing for communicating said conditions from said conditions sensor to said display;
   a rechargeable battery disposed within said housing for powering said device;
   a solar panel disposed within said housing for recharging said battery;
   said upper portion of said housing being structured to refract light from outside said housing onto said solar panel; and
   wherein said device floats in said water with said upper portion substantially above water.

2. The device of claim 1 wherein:
   said display is digital;
   said display has a front side and a back side;
   said conditions are displayed on said front side of said display;
   said display is translucent such that said display can be illuminated from said back side;
   said lower portion of said housing includes a lower interior face and a lower exterior face; and
   said lower interior face is disposed at an angle with respect to said lower exterior face such that light passing from outside said housing through said lower exterior face is refracted as a result of said angle toward said back side of said display.

3. The device of claim 2 wherein:
   said upper portion of said housing includes a facade and an end;
   said front side of said display is visible through said facade;
   said solar panel is disposed near said end; and
   said end includes facets, said facets being disposed at angles to one another, said facets facing said solar panel such that light passing from outside said housing through said facets is refracted toward said solar panel.

4. The device of claim 3 wherein:
   said conditions sensor includes a water temperature transducer for providing a voltage proportional to said water's temperature; and
   said communicator includes a processor processing said voltage into a primary digital signal and a driver for driving said display according to said primary digital signal.

5. The device of claim 4 further comprising a control module for controlling said solar panel's rate of recharging said battery such that said battery's temperature remains within a predetermined range.

6. The device of claim 5 wherein said control module further comprises:
   a battery temperature sensor for gauging said battery's temperature; and
   a shifting mechanism for decreasing said rate of recharging whenever said battery's temperature exceeds a predetermined temperature and for increasing said rate of recharging whenever said battery's temperature is below said predetermined temperature.

7. The device of claim 6 further comprising:
   a clock for keeping real time;
   wherein said conditions sensor further comprises an acidity sensor for monitoring a pH level of said pool and an ORP sensor for monitoring an oxidation reduction potential of said pool;
   wherein said processor processes said real time, said pH level, and said oxidation reduction potential into additional digital signals;
   said driver additionally drives said display according to said additional digital signals.

8. The device of claim 7 further comprising a switching mechanism for alternating according to which among said digital signals said driver drives said display.

9. A water monitoring device comprising:
   a substantially transparent, buoyant housing having an upper portion and a lower portion, said upper portion having a facade and an end;
   a conditions sensor disposed primarily within said housing, extending partially from said housing, for measuring a select physical condition of said water;
   a processor processing said condition into a corresponding digital signal;
   a digital display, having a front side and a back side, disposed within said housing for displaying said condition on said front side such that said condition can be read through said facade of said upper portion of said housing;
   said display being translucent such that said display can be illuminated from said back side;
   a driver for driving said display according to said digital signal;
   said lower portion of said housing including a lower interior face and a lower exterior face, said lower interior face being disposed at an angle with respect to said lower exterior face such that light passing from outside said housing through said lower exterior face is refracted as a result of said angle toward said back side of said display;
   a rechargeable battery disposed within said housing for powering said device;
   a solar panel disposed within said housing substantially near said end for recharging said battery;
   said end of said upper portion of said housing including facets, said facets being disposed at angles to one another, said facets facing said solar panel such that light passing from outside said housing through said facets is refracted toward said solar panel; and wherein said device floats in said water with said upper portion substantially above water.

10. The device of claim 9 wherein:

said conditions sensor includes a water temperature transducer for providing a voltage proportional to said water's temperature; and said corresponding digital signal includes a primary discrete digital signal processed by said processor from said voltage.

11. The device of claim 9 further comprising a control module for controlling said solar panel's rate of recharging said battery such that said battery's temperature remains within a predetermined range.

12. The device of claim 11 wherein said control module further comprises:

a battery temperature sensor for gauging said battery's temperature; and a shifting mechanism for decreasing said rate of recharging whenever said battery's temperature exceeds a predetermined temperature and for increasing said rate of recharging whenever said battery's temperature is below said predetermined temperature.

13. The device of claim 12 further comprising:

a clock for keeping real time;

said conditions sensor further comprising an acidity sensor for monitoring a pH level of said pool and an ORP sensor for monitoring an oxidation reduction potential of said pool; and said corresponding digital signal further including a set of additional discrete digital signals as a result of said processor's processing said real time, said pH level, and said oxidation reduction potential.

14. The device of claim 13 further comprising a switching mechanism for alternating according to which among said discrete digital signals said driver drives said display.

15. A water monitoring device comprising:

a transparent, buoyant housing having an upper portion and a lower portion, said upper portion having a facade and an end;

a water temperature transducer for providing a voltage proportional to said water's temperature;

an acidity sensor for monitoring a pH level of said pool;

an ORP sensor for monitoring an oxidation reduction potential of said pool;

a clock for keeping real time;

a processor for processing said voltage, said pH level, said oxidation reduction potential, and said time into corresponding digital signals;

a digital display having a front side and a back side, said display disposed within said housing for alternately displaying said water's temperature, said pH level, said oxidation reduction potential, and said time on said front side such that said display can be read through said facade;

said display being translucent such that said display can be illuminated from said back side;

a driver for driving said display according to said digital signals;

a switching mechanism for alternating according to which among said digital signals said driver drives said display;

said lower portion of said housing including a lower interior face and a lower exterior face, said lower interior face being disposed at an angle with respect to said lower exterior face such that light passing from outside said housing through said lower exterior face is refracted as a result of said angle toward said back side of said display;

a rechargeable battery disposed within said housing for powering said device;

a solar panel disposed within said housing substantially near said end for recharging said battery;

a battery temperature sensor for gauging said battery's temperature;

a control module for decreasing said rate of recharging whenever said battery's temperature exceeds a predetermined temperature and for increasing said rate of recharging whenever said battery's temperature is below said predetermined temperature;

said end of said upper portion of said housing including facets, said facets being disposed at angles to one another, said facets facing said solar panel such that light passing from outside said housing through said facets is refracted toward said solar panel; and wherein said device floats in said water with said upper portion substantially above water.

* * * * *